United States Patent
Roussey

(10) Patent No.: US 9,430,554 B2
(45) Date of Patent: Aug. 30, 2016

(54) OBJECT-RELATIONAL MAPPING BASED ON VIRTUAL COLUMNS

(71) Applicant: Weebly, Inc., San Francisco, CA (US)

(72) Inventor: Steven T. Roussey, San Francisco, CA (US)

(73) Assignee: Weebly, Inc., San Francisco, CA (US)

( * ) Notice: Subject to any disclaimer, the term of this patent is extended or adjusted under 35 U.S.C. 154(b) by 264 days.

(21) Appl. No.: 14/472,169

(22) Filed: Aug. 28, 2014

(65) Prior Publication Data

US 2016/0063092 A1    Mar. 3, 2016

(51) Int. Cl.
*G06F 17/30* (2006.01)
(52) U.S. Cl.
CPC ... *G06F 17/30604* (2013.01); *G06F 17/30312* (2013.01)
(58) Field of Classification Search
CPC ............... G06F 17/30312; G06F 17/30604; G06F 17/30917
See application file for complete search history.

(56) References Cited

U.S. PATENT DOCUMENTS

2013/0103705 A1    4/2013  Thomas
2014/0095442 A1    4/2014  Guo et al.

OTHER PUBLICATIONS

PCT International Search Report and Written Opinion for PCT/US15/23609, Jul. 20, 2015, 11 Pages.

*Primary Examiner* — Jorge A Casanova
(74) *Attorney, Agent, or Firm* — Fenwick & West LLP

(57) ABSTRACT

A server system allows object relational mapping. Objects of an object type are stored as records in a table corresponding to the object type. The server system allows new attributes to be added to an object type without altering the corresponding table. The object type comprises a set of mapped attributes that correspond to distinct columns of the associated table. The object type further comprises unmapped attributes that fail to map to distinct columns of the table. The table is associated with a virtual column for storing the unmapped attributes. The unmapped attributes of an object of the object type are encoded into a value and stored in the virtual column. The virtual column may be a column of the same table or a column of an auxiliary table. The unmapped attributes may also be stored as name value pairs in an auxiliary table associated with the table.

20 Claims, 9 Drawing Sheets

OBJECT-RELATIONAL MAPPING BASED ON VIRTUAL COLUMNS

BACKGROUND

This invention relates generally to database applications and in particular to database applications that use object relational mapping.

Applications typically store data in databases. For example e-commerce applications store information describing products, orders, transactions, and so on in databases. Data is often stored in databases as tables or relations. A relational model describes the representation of the data stored in the database. Applications typically use an object representation of entities, for example, products, orders, and so on. The object representation is manipulated using instructions provided using a programming language. The object representation of the data model is mapped to a relational representation of the data model to allow transformation between the two representations.

A relational model is typically modified less often compared to the object model. Modification of the relational model corresponds to modification of a database schema. A database may store large amount of data and modifying the database schema may require reorganizing existing data. This may require movement of large amount of data stored on a persistent storage. As a result, modifying the relational model may consume large amount of resources and may slow down the database as well as applications using the database. As a result, database administrators often do not allow modifications to database schema used by an application.

In contrast, the object representation of the data model changes more frequently. For example, the object model may be modified as developers make modifications to the applications, add new features, fix defects, and so on. Conventional object relational mapping techniques require the relational model to be modified to match any changes to the object model. As a result, the database system may have to be upgraded to match the modifications to the object model, thereby disrupting the applications using the databases. Alternatively, the developers may be required to limit the amount of modifications they make to the object model, for example, to major releases of software. As a result, conventional techniques are inadequate to handle the changes required in a fast paced development environment.

SUMMARY

Embodiments of the invention map operations on an object model to operations of a relational model. The object model includes a plurality of object types and the relational model includes a plurality of tables. Object types of the object model are associated with tables of the relational model. Embodiments of the invention allow new attributes to be added to an object type without requiring new columns to be added to the corresponding table. The data corresponding to these new attributes is stored in a virtual column associated with the table. The virtual column may be a column of the table or a column of an auxiliary table.

The object type includes a set of mapped attributes that are associated with distinct columns of the table. The object type also includes a set of unmapped attributes that fail to map to distinct columns of the table. An object of the object type is stored as follows. The mapped attributes of the object are stored as a record of the table, such that each mapped attribute is stored as the corresponding column value in the record. The unmapped attributes are encoded into a value. The encoded value is stored in the virtual column.

In some embodiments, the unmapped attributes of the object are stored in an auxiliary table configured to store name-value pairs. The object is stored in the database by performing the following operations. Each mapped attribute of the object is stored as a value of a corresponding column of the table. The set of unmapped attributes are stored as name-value pairs in the auxiliary table.

The features and advantages described in this summary and the following detailed description are not all-inclusive. Many additional features and advantages will be apparent to one of ordinary skill in the art in view of the drawings, specification, and claims.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

DETAILED DESCRIPTION

Overall System Environment

Figure 1:
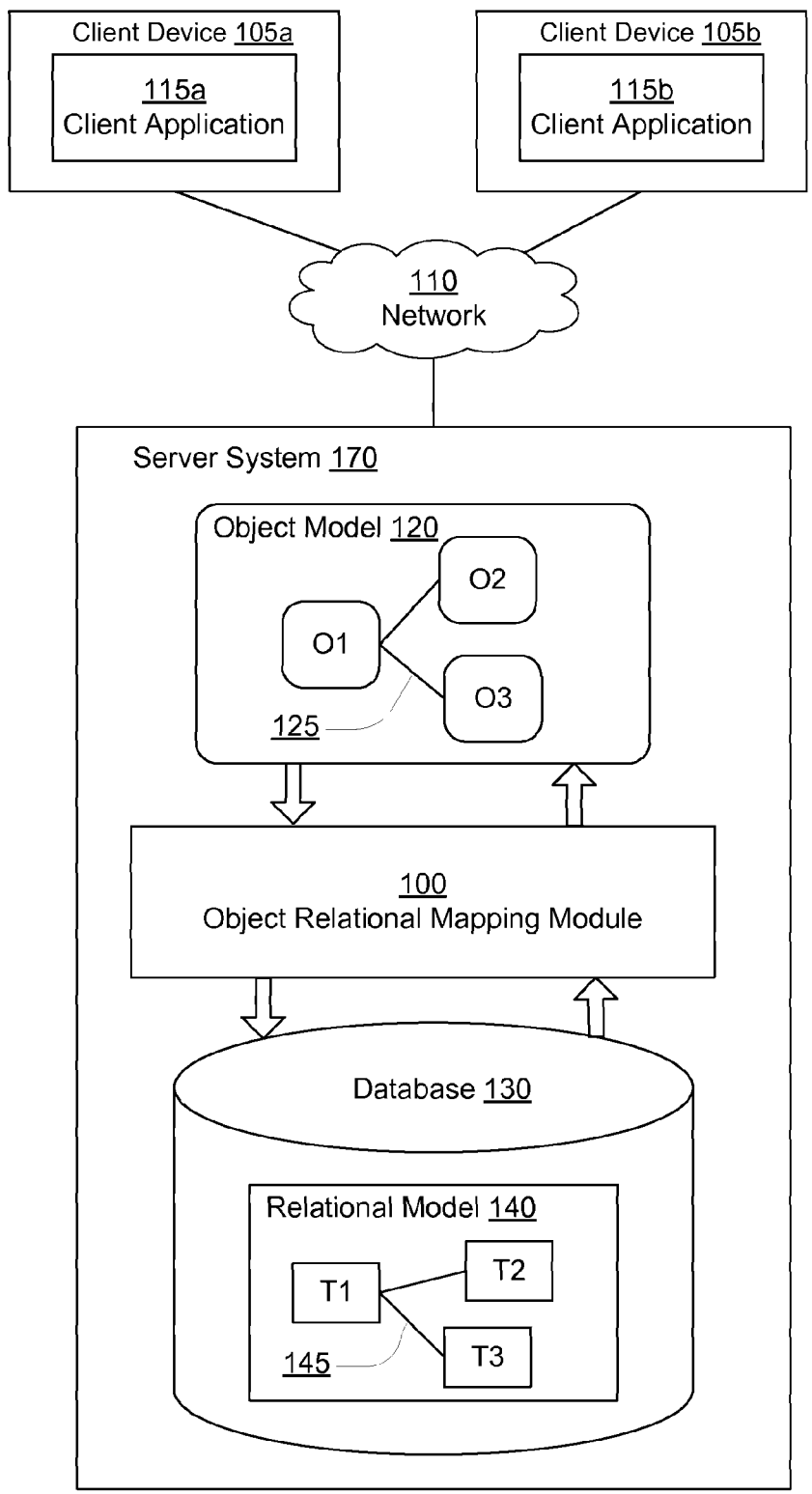
FIG. 1 is diagram illustrating an overall system environment based on an object relational mapping, in accordance with an embodiment of the invention.

FIG. 1 is diagram illustrating an overall system environment based on an object relational mapping, in accordance with an embodiment of the invention. As shown in FIG. 1, the system environment includes two client devices 105a and 105b connected to a server system 170 through a network 110. FIG. 1 and the other figures use like reference numerals to identify like elements. A letter after a reference numeral, such as "105a," indicates that the text refers specifically to the element having that particular reference numeral. A reference numeral in the text without a following letter, such as "105," refers to any or all of the elements in the figures bearing that reference numeral (e.g. "105" in the text refers to reference numerals "105*a*" and/or "105*b*" in the figures).

In one embodiment, the client devices 105 are conventional computer systems executing, for example, a Microsoft Windows-compatible operating system (OS), Apple OS, and/or a Linux distribution. In another embodiment, the client devices 105 can be devices having computer functionality, such as a personal digital assistant (PDA), mobile telephone, video game system, etc. The client device 105 includes a client application 115 configured to interact with the server system 170 via the network 110. The client application 115 may be an internet browser application. Network 110, may comprise any combination of local area and/or wide area networks, using both wired and/or wireless communication systems. In one embodiment, the network 110 uses standard communications technologies and/or protocols.

The server system 170 includes a database 130 that stores data processed by the server system 170. The data stored in database 130 is read and processed by the server system 170 for sending to the client device 105 for presentation via the client application 115. Furthermore, the server system 170 may receive data or instructions from the client device 105 that cause modifications to data stored in the database 130. The modifications to the data stored in the database 130 includes insertion of new data records, updates to existing data records, deletion of data records, and so on.

The server system 170 typically includes a database server (not shown in FIG. 1) which is a computer program that interacts with the database 130 and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like.

The computing system used for hosting the server system 170 is typically a server class system that uses powerful processors, large memory, and fast input/output systems compared to a typical computing system used, for example, as a client device 105. The server typically has large secondary storage, for example, using a RAID (redundant array of independent disks) array.

FIG. 1 shows an embodiment in which the database 130 is a relational database. The relational database represents data as relations or tables comprising records. The database 130 may represent relations between tables, for example, relations based on foreign keys. FIG. 1 shows tables T1, T2, and T3 and relations 145 between the tables. Applications typically interact with the database 130 using an interface, for example, a structure query language (SQL).

An example server system 170 may implement the backend of an e-commerce application that interacts with users via the client application 115. New data records may be inserted in the database 130 representing orders requested by users. Data may be updated, for example, inventory information as users purchase items. Furthermore, the enterprise managing the e-commerce system may update data by providing information describing new products, by modifying information describing existing products, or by removing certain products.

The server system 170 maintains an object model 120 representing entities used by applications. The object model 120 represents entities as objects O1, O2, O3, and so on. For example, the server system implementing an e-commerce system may represent products, orders, images, transactions, and so on as objects. The objects in the object model may have relations 125 between them. For example, an object representing an order may be related to an object representing one or more products associated with the order. Each product object may be associated with one or more SKU (stock keeping unit) objects, image objects, and so on. The object model 120 includes executable instructions that may be obtained by compiling or executing programs implemented using a programming language, for example, JAVA, PYTHON, PHP (hypertext processor), and so on.

The server system 170 includes an object relational mapping module 100 that maps data represented in the relational model 140 to objects in the object model 120 and vice versa. As an example, the server system 170 receives a request to read data corresponding to a particular object, for example, an object representing a product identified by name. The object relational mapping module 100 generates database queries to read the record corresponding to the identified product and generates an object based on the data obtained from the record. The database query may be a SELECT statement of SQL language.

As another example, the server system 170 receives a request to update an object, for example, the product object. The server system 170 performs an update to the object representation in the object model 120. In response to the update to the object representation, the object relational mapping 100 generates the corresponding update statements and executes the update statements to modify the corresponding records of the database 130.

Similarly, the server system 170 may receive a request to create a new object, for example, an order object. The server system 170 creates the requested object in the object model 120. In response to the new object created in the object model 120, the object relational mapping 100 generates an insert statement and executes the insert statement to add a new record in the database 130 corresponding to the object created.

As another example, the server system 170 may receive a request to delete an object. The server system 170 deletes the requested object in the object model 120. In response to the deletion of the object in the object model 120, the object relational mapping 100 generates a delete statement and executes the delete statement to delete one or more record(s) of the database 130 corresponding to the object deleted.

If every attribute of an object in the object model 120 is mapped to columns of a table in the relational model 140, the object relational mapping module 100 can generate the appropriate database statements for processing create, read, update, and delete requests of objects. However, in conventional systems, if the object model 120 gets modified and the relational model 140 has not been updated to match the modified object model 120, the object relational mapping module 100 cannot store the object in a database table by mapping each attribute of the object to a column of the table.

Therefore, embodiments of the invention include an additional column in tables of the relational model 140 that represent objects of the object model 120. The additional column is referred to herein as a virtual column. The virtual column is a placeholder column that stores data corresponding to any of the object type attributes that fail to match a corresponding column in the table. The virtual column is configured to store different types of attributes and is capable of holding data of variable sizes. The following figures illustrate how a table with a virtual column is used to store data corresponding to objects.

Figure 2:
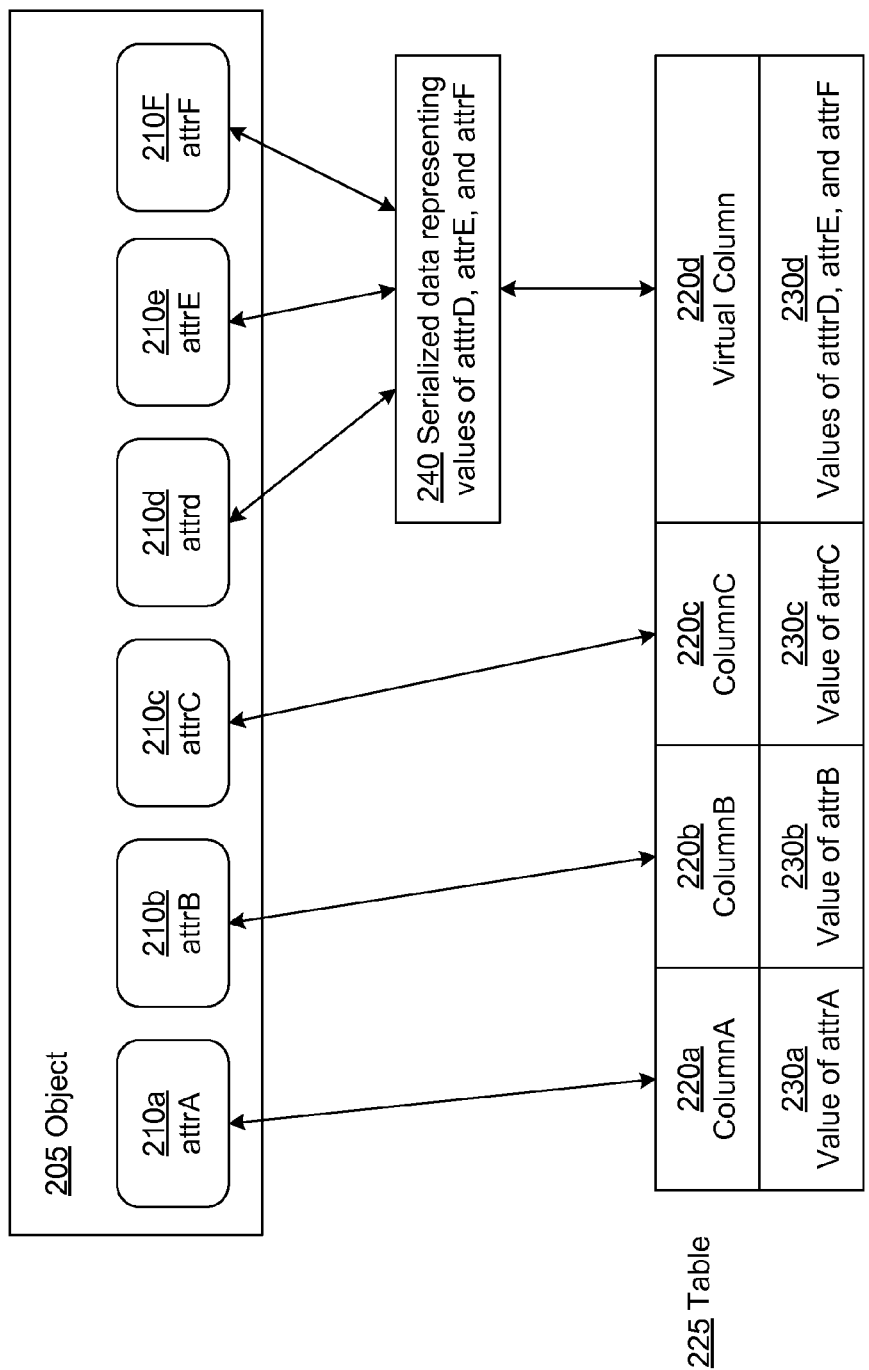
FIG. 2 illustrates how a virtual column is used in an object relational mapping, in accordance with an embodiment of the invention.

FIG. 2 shows how a virtual column is used in an object relational mapping, in accordance with an embodiment of the invention. FIG. 2 shows an object 205 that is mapped to records of table 225 stored in the database 130. A mapped attribute of an object type is an attribute that is mapped to a distinct column of the corresponding table in the relational model. However, not all attributes of the object type may be mapped to a distinct column of the table. For example, an object type may have been modified by a developer to include more attributes while the corresponding table in the relational model is not altered to include additional columns corresponding to the new attributes added to the object type. These attributes of the object type that do not map to a distinct column of the table are referred to as unmapped attributes.

As shown in FIG. 2, object 205 has various attributes including attrA 210a, attrB 210b, attrC 210c, attrD 210d, attrE 210e, and attrF 210f. The table 225 has columns 220 including columnA 220a, columnB 220b, columnC 220c, and virtual column 220d. There may be additional columns of the tables shown in FIGS. 2 and 3 that are not shown for purposes of clarity. For example, table 225 may include an id (identifier) column to store a unique identifier for identifying an object.

Attributes attrA, attrB, and attrC of the object 205 are mapped to distinct columns of table 225. For example, attribute attrA 210a is mapped to columnA 220a, attribute attrB 210b is mapped to columnB 220b, and attribute attrC 210c is mapped to columnC 220c. However, the table 225 does not include a distinct column for holding attributes attrD 210d, attrE 210e, and attrF 210f. These attributes are referred to as unmapped attributes.

The table 225 includes the virtual column 220d that is used by the object relational mapping module 100 to store the values of all unmapped attributes, i.e., attrD, attrE, and attrF. The object relational mapping module 100 uses an encoding to represent these unmapped attributes as value of a single type, for example, a binary array or a character array. In an embodiment, the value of the single type used to hold the unmapped attributes is obtained by serializing an object comprising the unmapped attributes attrD 210d, attrE 210e, and attrF 210f. The serialized representation of the single object encoding all the unmapped attributes of object 205 is stored in the virtual column 220d.

To read an object corresponding to a record in the table 225, the object relational mapping module 100 creates an instance of the object type associated with the table 225. The object relational mapping module 100 assigns values from columns of the table to attributes of the object, for example, the value from columnA 220a is assigned to attribute attrA, the value from columnB 220b is assigned to attribute attrB, and the value from columnC 220c is assigned to attribute attrC. Furthermore, the object relational mapping module 100 reads the value in the virtual column 220d and decodes or deserializes the value to obtain the values of the three unmapped attributes attrD 210d, attrE 210e, and attrF 210f.

In some situations, the virtual column for storing the unmapped attributes is included in a table different from the table 225. Accordingly, the database 130 stores an auxiliary table corresponding to the table 225 comprising the virtual column. This auxiliary table is used to store the encoded value of all the unmapped attributes. An auxiliary table may include multiple virtual columns, one for each table associated with an object type.

Figure 3:
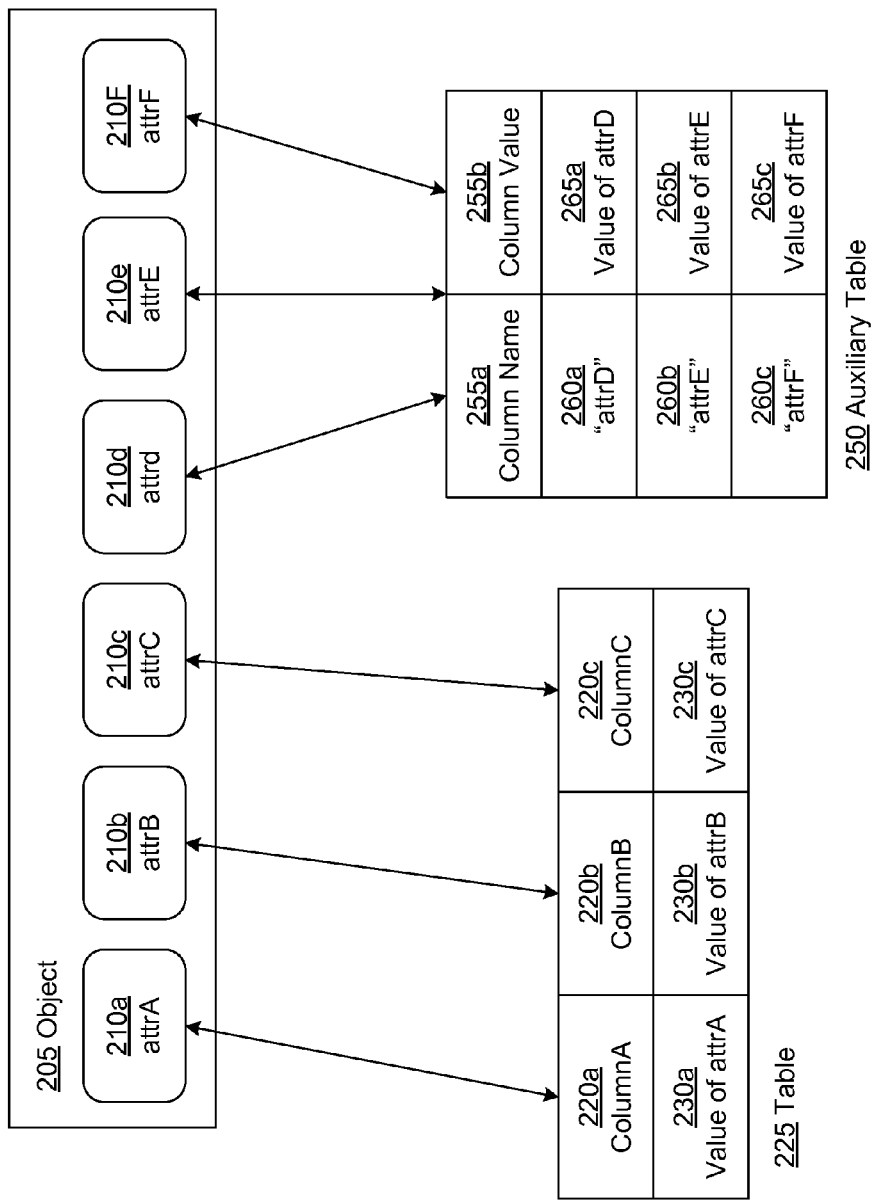
FIG. 3 shows how a table storing name-value pairs is used in an object relational mapping, in accordance with another embodiment of the invention.

FIG. 3 shows how a table storing name-value pairs is used in an object relational mapping, in accordance with another embodiment of the invention. In some embodiments, the unmapped attributes of an object type are stored in an auxiliary table corresponding to the table 225 that includes two columns, a name column and a value column. These two columns can be used to store any number of unmapped attributes of object 205, for example, as illustrated in FIG. 3. The auxiliary table 250 may also include additional columns, for example, an id (identifier) column to store a unique identifier for identifying an object corresponding to the unmapped attributes.

As shown in FIG. 3, some of the attributes of the object 205 are mapped to distinct columns of table 225. For example, attribute attrA 210a is mapped to columnA 220a, attribute attrB 210b is mapped to columnB 220b, and attribute attrC 210c is mapped to columnC 220c. The remaining unmapped attributes attrD 210d, attrE 210e, and attrF 210f are stored in the auxiliary table 250.

The auxiliary table 250 includes a column name 255a and a column value 255b. Each unmapped attribute from the object 205 is stored as a separate row in the auxiliary table 250. Each row of the auxiliary table 250 stores a representation of name of the attribute, for example, a character string representation, and the value of the attribute. The value of the attribute may be converted to the type of the name column of the auxiliary table 250.

The value column 255b is configured to hold values of different types. In an embodiment, the value column 255b stores all values as a generic type that can store different types of values, for example, binary type. In some embodiments, the auxiliary table 250 includes a type column (not shown in FIG. 3) to specify the type of the attribute. In other embodiments, the object relational mapping module 100 stores metadata describing the types of various attributes and uses the information to convert from the generic type of value column 255b to the specific type of the attribute. For example, the metadata may specify that attrD 210d is of type integer, and attrE and attrF are of type string.

If the object relational mapping module 100 receives a read request, the object relational mapping module 100 converts the data from the value column 255b to the appropriate type before storing the values in the object 205. Similarly, while storing or updating the data in the relational model, the object relational mapping module 100 converts the value of each unmapped attributes to the generic type of the value column, for example, binary type.

Computer Architecture

Figure 4:
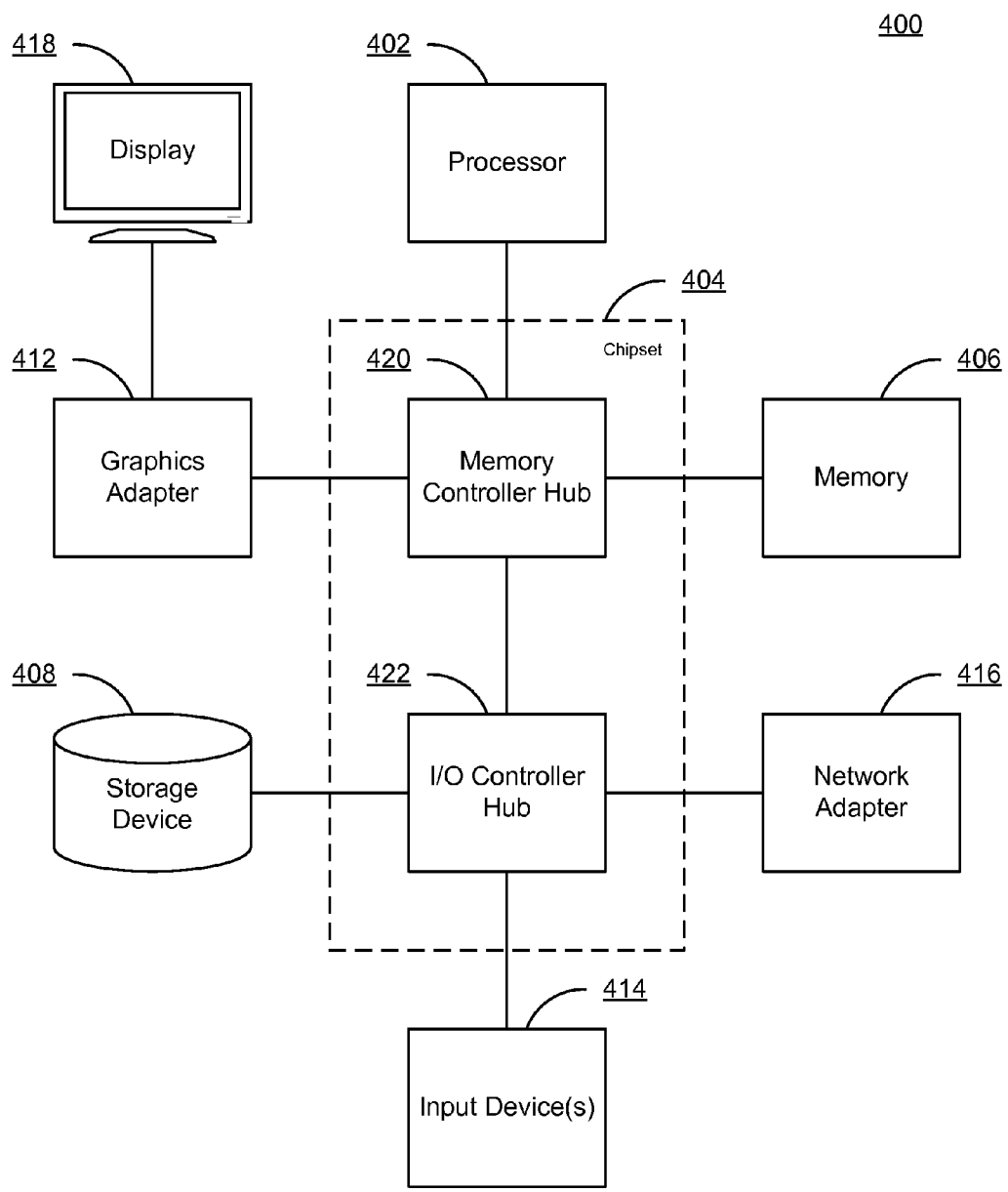
FIG. 4 is a high-level block diagram illustrating an example of a computer for use in the system environment shown in FIG. 1 according to one embodiment of the present disclosure.

FIG. 4 is a high-level block diagram of the components of a computing system 400 for use, for example, as the server system 170 or the client device 105 shown in FIG. 1, in accordance with one embodiment. The computing system 400 includes at least one processor 402 coupled to a chipset 404. Also coupled to the chipset 404 are a memory 406, a storage device 408, a graphics adapter 412, input device(s) 414, and a network adapter 416. A display 418 is coupled to the graphics adapter 412. In one embodiment, the functionality of the chipset 404 is provided by a memory controller hub 420 and an input/output (I/O) controller hub 422. In another embodiment, the memory 406 is coupled directly to the processor 402 instead of the chipset 404.

The processor 402 is an electronic device capable of executing computer-readable instructions held in the memory 406. In addition to holding computer-readable instructions, the memory 406 also holds data accessed by the processor 402. The storage device 408 is a non-transitory computer-readable storage medium that also holds computer readable instructions and data. For example, the storage device 408 may be embodied as a solid-state memory device, a hard drive, compact disk read-only memory (CD- ROM), a digital versatile disc (DVD), or a BLU-RAY disc (BD). The input device(s) 414 may include a pointing device (e.g., a mouse or track ball), a keyboard, a touch-sensitive surface, a camera, a microphone, sensors (e.g., accelerometers), or any other devices typically used to input data into the computer 400. The graphics adapter 412 displays images and other information on the display 418. In some embodiments, the display 418 and an input device 414 are integrated into a single component (e.g., a touchscreen that includes a display and a touch-sensitive surface). The network adapter 416 couples the computing device 400 to a network, such as the network 101.

As is known in the art, a computer 400 can have additional, different, and/or other components than those shown in FIG. 4. In addition, the computer 400 can lack certain illustrated components. In one embodiment, a computer 400 acting as a server may lack input device(s) 414, a graphics adapter 412, and/or a display 418. Moreover, the storage device 408 can be local and/or remote from the computer 400. For example, the storage device 408 can be embodied within a storage area network (SAN) or as a cloud storage service.

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, computer program modules are stored on the storage device 408, loaded into the memory 406, and executed by the processor 402.

As used herein, a computer program product comprises one or more computer program modules that operate in conjunction to provide the functionality described herein. Thus, a computer program product may be stored on the storage device 408, loaded into the memory 406, and executed by the processor 402 to provide the functionality described herein.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

System Architecture

Figure 5:
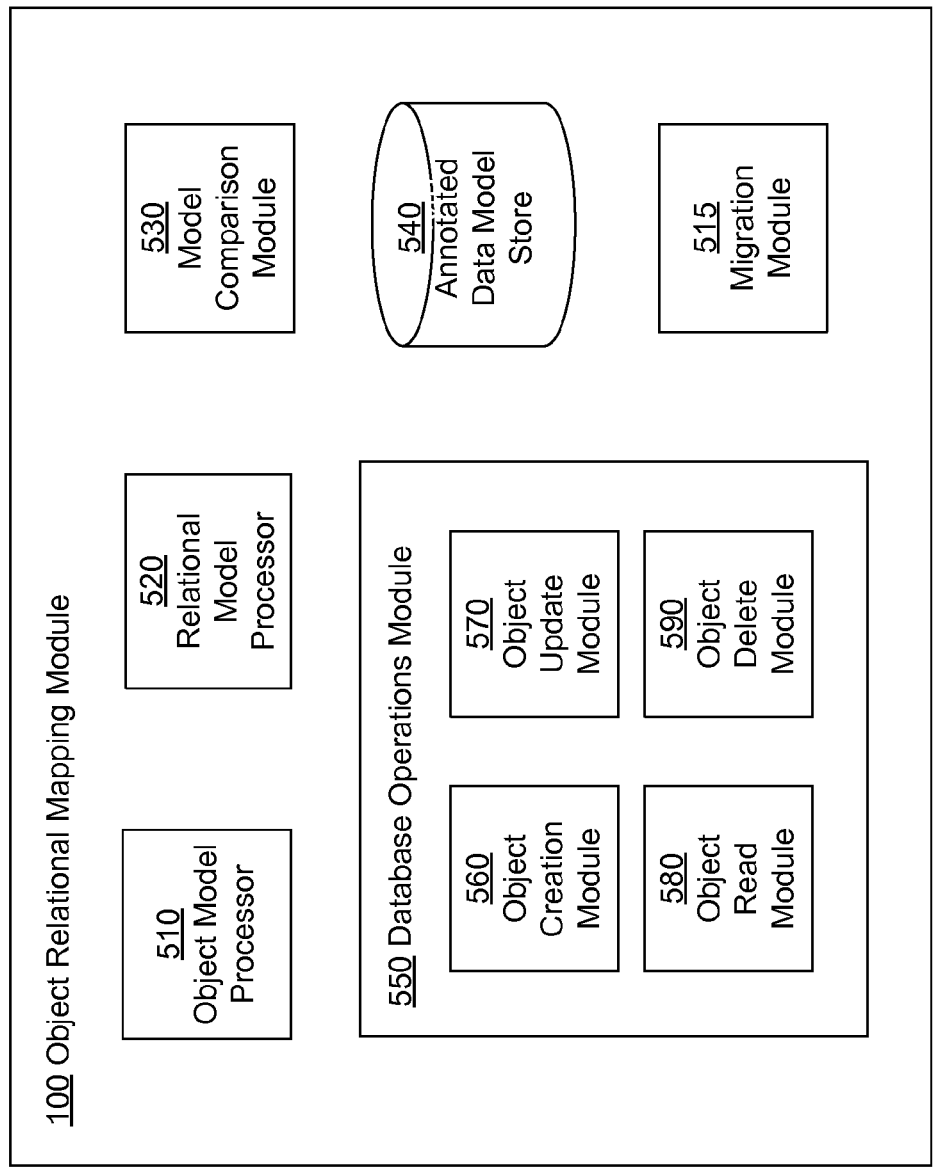
FIG. 5 is a diagram of an object relational mapping module illustrated in FIG. 1, in accordance with an embodiment of the invention.

FIG. 5 is a diagram of an object relational mapping module 100 of the server system 170 illustrated in FIG. 1, in accordance with an embodiment of the invention. FIG. 5 shows that the object relational mapping module 100 includes an object model processor 510, a relational model processor 520, a model comparison module 530, an annotated data model store 540, a migration module 515, and a database operations module 550. In some embodiments, some of these modules may be represented as being independent of the object relational mapping module 100. Furthermore, a particular functionality or feature described herein as implemented by a particular module may be implemented by one or more other modules. Some of the modules may be part of a system different from the server system 170.

The object model processor 510 analyzes information describing the object model 120 to build a representation of the object model 120 comprising information used for performing the object relational mapping. In an embodiment, the information describing the object model 120 is available as comments included in source code that defines the corresponding objects, for example, using PHP language. In other embodiments, the information describing the object model 120 is available as a markup language, for example, XML (extensible markup language). The object model processor 510 generates a data structure describing the different types of objects available in the object model 120, their attributes and information describing each attribute. The specification may define the table that corresponds to a particular type of object and the columns that correspond to different attributes of the object. The specification may also identify the name of the virtual column of the corresponding table. In some embodiments, the name of the virtual column may be predefined, for example, "virtual."

The relational model processor 520 analyzes information describing the relational model 140 and builds a representation of the relational model 140 comprising information used for performing the object relational mapping. In an embodiment, the relational model processor 520 uses application programming interface (API) provided by database 130 that allows the relational model processor 520 to retrieve metadata describing different tables of the database 130. The relational model processor 520 obtains the list of tables that correspond to object types of the object model 120 from the object model processor 510. In an embodiment, the representation of the relational model 140 identifies different tables used by the object model processor 510 and columns of each table corresponding to mapped attributes of the object types as well as any virtual column of the table.

The model comparison module 530 compares the representation of the object model 120 build by object model processor 510 with the representation of the relational model 140 built by the relational model processor 520. The model comparison module 530 identifies unmapped attributes of object types defined in the object model processor 510 as the attributes that do not have a mapping specified to a distinct column of the relational model 140. The model comparison module 530 marks these attributes as virtual. In other words, the model comparison module 530 identifies the unmapped attributes of each object that does not have a direct mapping specified to a particular column of a table and marks them as virtual. The attributes marked virtual are identified for being stored in a virtual column. In some embodiments the model comparison module 530 performs the functionality of relational model processor 520 by directly fetching the metadata describing the tables and comparing the metadata to the representation of the object model instead of building a separate representation of the relational model.

The model comparison module 530 generates an annotated data model that is based on the result of comparison of the representation of object model 120 with the relational model 140 and stores the annotated data model in the annotated data model store 540. The annotated data model includes the information describing the tables corresponding to each object, the mappings of attributes to columns including mapping from attributes to the virtual column. Accordingly, the annotated data model store 540 includes all the information to generate database statements corresponding to operations performed on the objects.

The migration module 515 allows migration of data from the virtual column to other columns of the table if at some stage the table is altered to add columns for representing data of the attributes that were previously unmapped. For example, assume that a set X of attributes are stored in the virtual column of a table. Assume that the table is altered to add columns directly mapping to at least of subset Y of attributes from the set X. The migration module 515 processes the values stored in the virtual column to determine the values of the attributes of the set X, selects the values of the subset Y and writes them to their corresponding columns. The migration module 515 then selects the attributes of set X remaining after attributes of subset Y are removed and encodes them to store them back in the virtual column. In an embodiment, the migration module 515 executes an offline process that migrates all the rows of a table.

In some embodiments, the migration module 515 migrates records in response to requests received by the object relational mapping module 100 from the application using the object relational mapping module 100. For example, if the object relational mapping module 100 receives a request to read a particular object, the object relational mapping module 100 uses this opportunity to also migrate the corresponding database record. In some embodiments, the table storing the object data also includes a column to determine whether a particular row has been migrated or not.

The database operations module 550 generates database statements corresponding to operations performed on objects in the object model 120. The database operations module 550 executes these generated database statements to either retrieve data from the database or to update data in the database so as to ensure that the data of the relational model 140 corresponds to the data of the object model 120.

The database operations module 550 comprises modules object creation module 550, object update module 570, object read module 580, and object delete module 590. The object creation module 550 generates and executes database statements in response to creation of a new object in the object model 120. The object update module 570 generates and executes database statements in response an update to an existing object in the object model 120. The object delete module 590 generates and executes database statements in response a deletion of an existing object in the object model 120. The object read module 580 generates and executes database statements that read data from the database 130 and populate data in objects in the object model 120, for example, in response to a request to read a particular object identified by a unique attribute of the object or in response to a request to search for objects satisfying certain criteria. The details of various processes executed by these modules are further described herein.

Example Methods

FIGS. 6-9 show various processes used for mapping various operations performed in the object model with corresponding operations in the relational model. The steps performed in these processes can be performed by different modules than those indicated. Furthermore, certain steps of these processes can be performed in different order than those indicated, for example, certain steps can be performed in parallel.

Figure 6:
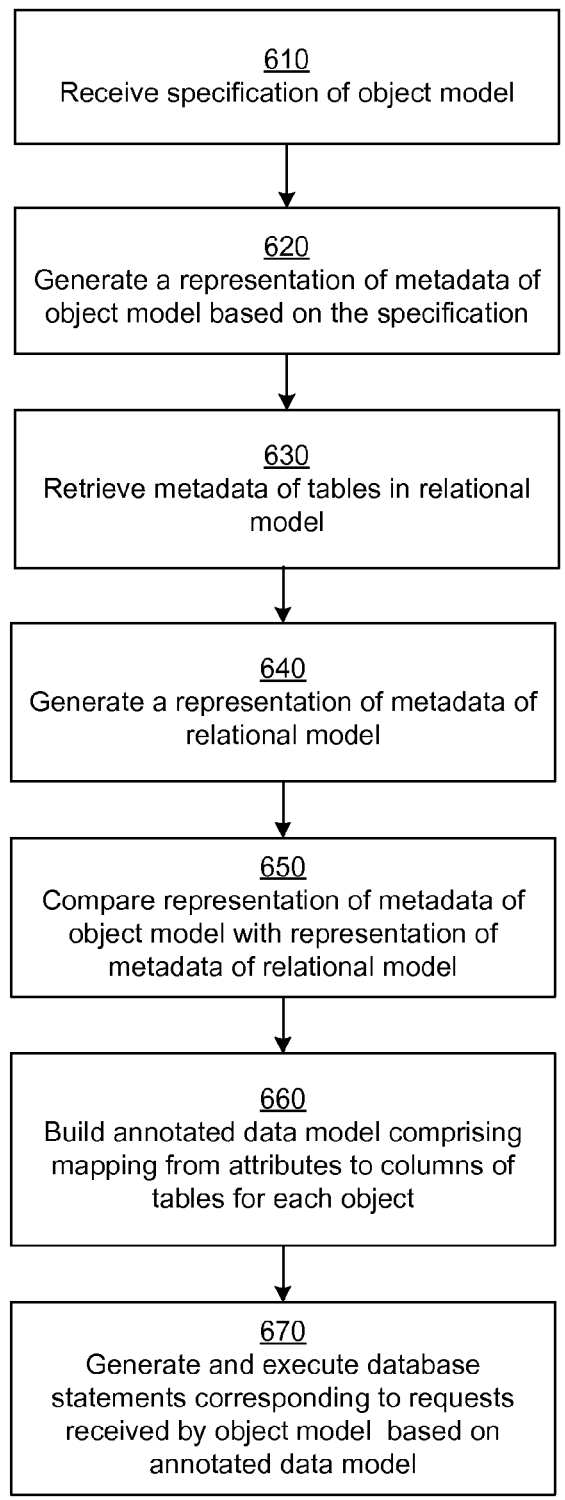
FIG. 6 is a flowchart of a method for processing data represented using database tables comprising virtual columns, in accordance with an embodiment of the invention.

FIG. 6 is a flowchart of a method for processing data represented using database tables comprising virtual columns, in accordance with an embodiment of the invention. The object model processor 510 receives 610 a specification of the object model. The object model processor 510 analyzes the specification to generate 620 a representation of the object model. The representation of the object model may be stored in-memory to allow fast access to information stored in the object model. The representation of the object model comprises various object types of the object model and their attributes.

The specification of the object model associates object types with corresponding tables in the relational model. At least some of the attributes of an object type are mapped to distinct columns of the corresponding table. These attributes are called mapped attributes. In other words, there is a one-to-one mapping between mapped attributes of an object type and columns of the corresponding table. Some object types may have attributes that are not mapped to distinct columns of the corresponding table. These are referred to as unmapped attributes. The object relational mapping module 100 identifies the unmapped attributes of an object type as follows.

The relational model processor 520 retrieves 630 metadata describing tables of the relational model. In an embodiment, the relational model processor 520 identifies the tables that map to object types in the object model and uses database APIs to retrieve metadata describing the identified tables. The relational model processor 520 generates 640 a representation of the relational model. The representation the relational model comprises description of various tables and columns of the tables.

The model comparison module 530 compares 650 the representation of metadata of the object model with the representation of the relational model. The model comparison module 530 builds 660 an annotated data model that stores associations between attributes of object types and columns of the corresponding table. The annotated data model is stored in the annotated data model store 540.

Figure 7:
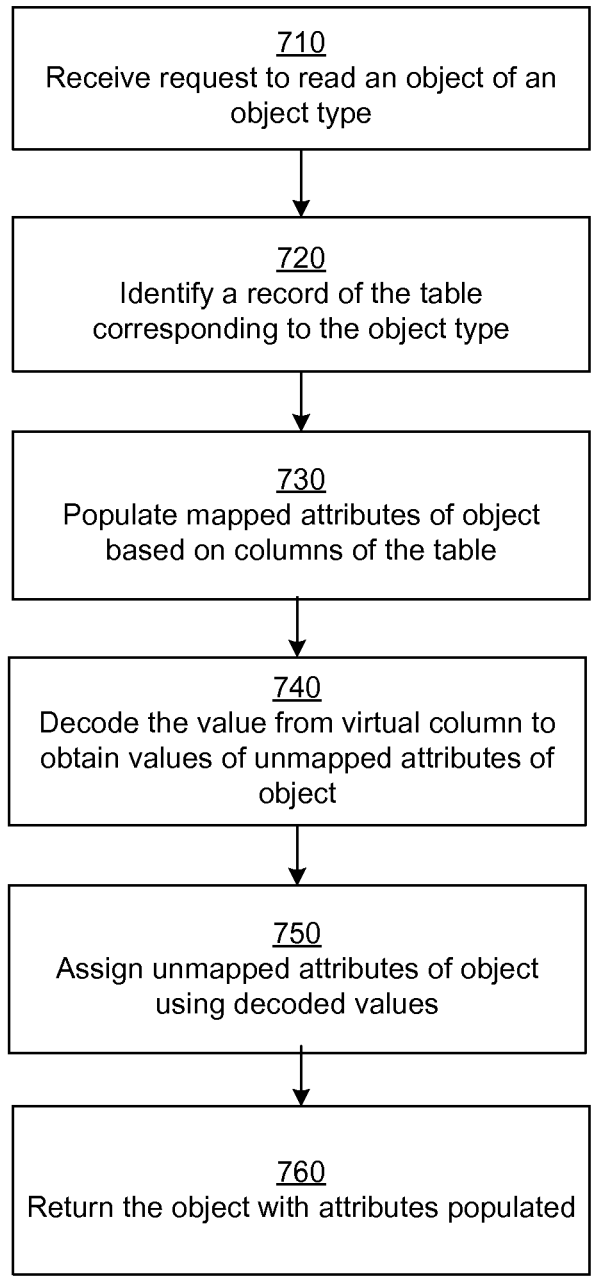
FIG. 7 is a flowchart of a method for reading an object in an object-relational mapping system, in accordance with an embodiment of the invention.
Figure 8:
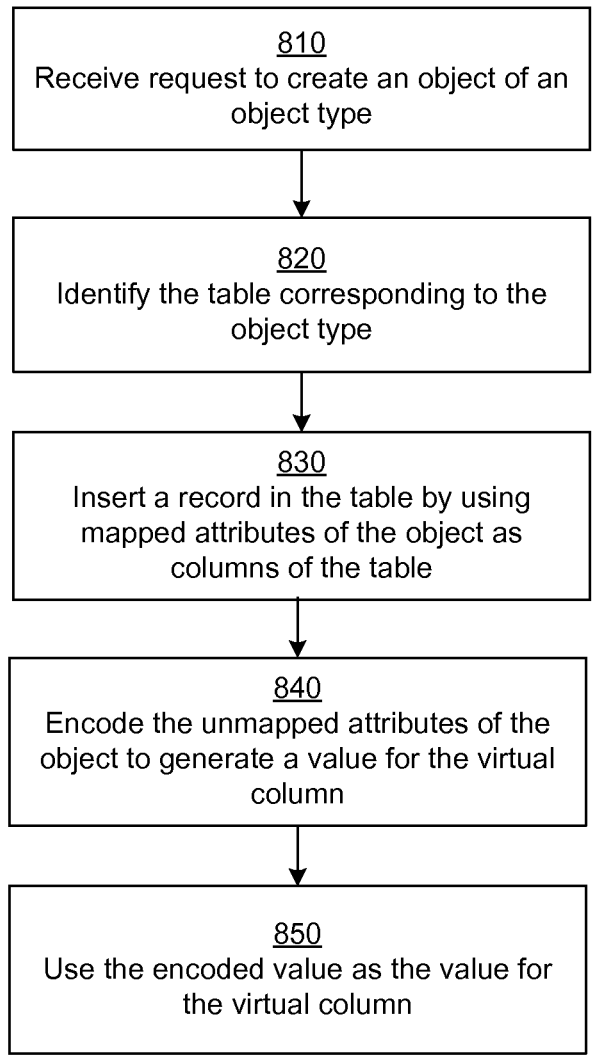
FIG. 8 is a flowchart of a method for creating a new object in an object-relational mapping system, in accordance with an embodiment of the invention.
Figure 9:
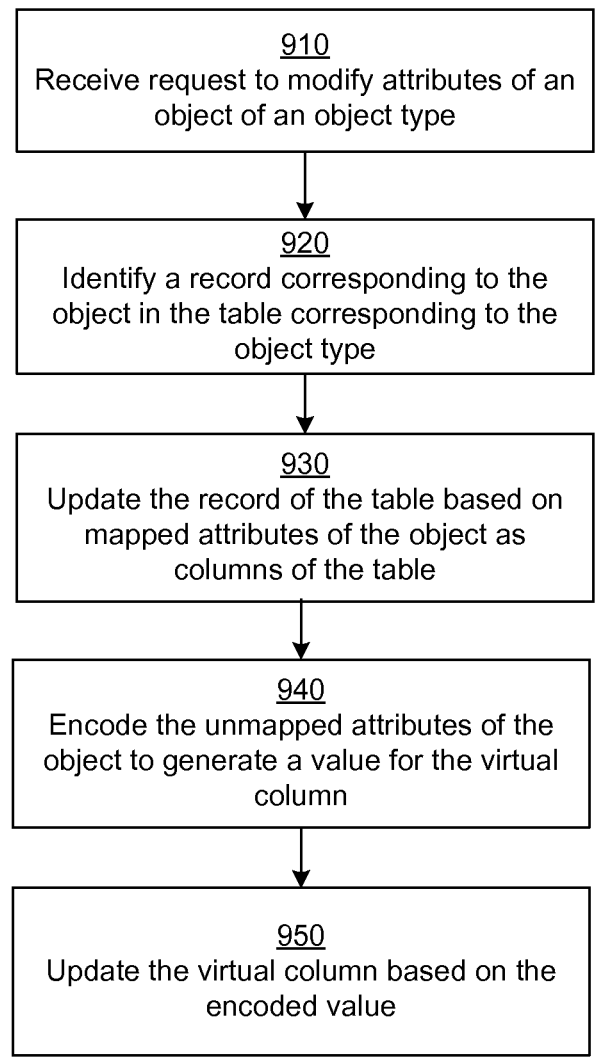
FIG. 9 is a flowchart of a method for modifying an object in an object-relational mapping system, in accordance with an embodiment of the invention.

The model comparison module 530 marks the attributes of each object type that do not map to a distinct column of a corresponding table as unmapped attributes. The model comparison module 530 identifies unmapped attributes of an object type as attributes to be stored in a virtual column. The database operations module 550 uses the annotated data model to perform mapping of the object model to the relational model for generating 670 appropriate database queries or statements corresponding to different types of operations on objects. FIGS. 7-9 illustrate how some of the operations on objects in the object model are mapped to corresponding operations in the relational model.

FIG. 7 is a flowchart of a method for reading an object in an object-relational mapping system, in accordance with an embodiment of the invention. The object read module 580 maps requests to read an object to retrieval of a record from the corresponding table in the relational model. The object relational mapping module 100 receives 710 a request to read an object of a particular object type. The request to read identifies the object, for example, by specifying an object identifier or any attribute that uniquely identifies the object. In an embodiment, the request to read an object may be associated with a search operation that searches a set of objects based on certain criteria.

The object read module 580 identifies the table corresponding to the object type and identifies 720 a record of the table corresponding to the object specified in the read request. In an embodiment, the object read module 580 builds a database query, for example, a select statement of SQL to retrieve one or more rows of the table. The database query includes the criteria specified in the read request to identify the object. For example, if the read request identifies the object by a particular object identifier, the database query includes a where clause specifying a value of a column corresponding to the object identifier.

The object read module 580 populates 730 the values of the mapped attributes of the object using the values of corresponding columns from the record. The object read module 580 retrieves the value of the virtual column corresponding to the object. The object read module 580 decodes 740 the value of the virtual column, for example, by performing a deserialize operation that generates an auxiliary object comprising the unmapped attributes of the requested object from the value of the virtual column. The object read module 580 assigns 750 values of the unmapped attributes of the object being read using the decoded values of the attributes obtained from the value of the virtual column. The object read module 580 760 returns the object with various attributes populated to the requestor of the object. If only a subset of the attributes of an object are being read, the object read module 580 checks if any of the unmapped attribute is requested for the object being read. If no unmapped attribute is requested, the object read module 580 does not load any value from the virtual column.

If the virtual column is a column of the table corresponding to the object type, the value of the virtual column is read as another column of the record. If the virtual column is stored as a value in an auxiliary table, the object read module 580 performs a second read operation to read the value from the auxiliary table. If the unmapped attributes are stored as name-value pairs in an auxiliary table, the object read module 580 may perform multiple read operations, one for each name-value pair associated with an unmapped attribute of the object being retrieved.

FIG. 8 is a flowchart of a method for creating a new object in an object-relational mapping system, in accordance with an embodiment of the invention. The object creation module 550 maps creation of a new object in the object model to insertion of a new record in the corresponding table in the relational model. The object relational mapping module 100 receives 810 a request to create a new object of a particular object type. The object creation module 550 identifies 820 a table of the database corresponding to the object type. The object creation module 550 generates a database statement for inserting a record in the identified table. For example, the object creation module 550 may generate an INSERT statement of SQL.

The object creation module 550 executes the database statement generated to insert 830 a record in the table. The inserted record comprises the values of the mapped attributes of the new object as the values of the corresponding columns. The object creation module 550 encodes the unmapped attributes of the object to determine a single value. The object creation module 550 uses 850 the determined single value as the value for the virtual column corresponding to the new object created.

If the virtual column is a column of the table corresponding to the object type, the object creation module 550 can perform a single insert operation that inserts a record in the table comprising values for the columns corresponding to mapped attributes and the encoded value for the virtual column. If the virtual column is stored as a value in an auxiliary table, the object creation module 550 performs a second insert operation to insert the encoded value in the auxiliary table. If the unmapped attributes are stored as name-value pairs in an auxiliary table, the object creation module 550 may perform multiple insert operations, one for each name-value pair associated with an unmapped attribute of the new object.

FIG. 9 is a flowchart of a method for modifying an object in an object-relational mapping system, in accordance with an embodiment of the invention. The object update module 570 maps modification of an existing object in the object model to updates to a record in the corresponding table in the relational model. The object relational mapping module 100 receives 910 a request to modify an existing object of a particular object type. The object update module 570 identifies the table corresponding to the object type and identifies 920 a record of the table corresponding to the object.

The object update module 570 generates a database statement to update the values of the record. For example, the object update module 570 generates an UPDATE statement of SQL. The object update module 570 executes the database statement generated to update 930 the record corresponding to the object. In an embodiment, the object update module 570 ensures that the update statement updates only the mapped attributes of the object that were modified. If any unmapped attribute of the object was modified, the object update module 570 encodes 940 all the unmapped attributes of the object to generate a new value for the virtual column. Accordingly, if any unmapped attribute of an object is modified, the object update module 570 loads all unmapped attributes so they can be reserialized together. The object update module 570 updates the value of the virtual column for the object based on the encoded value.

If the virtual column is a column of the table corresponding to the object type, the object update module 570 can perform a single update operation that updates any mapped attributes that need to be updated along with the encoded value for the virtual column. If the virtual column is stored as a value in an auxiliary table, the object update module 570 performs a second update operation to update the encoded value in the auxiliary table. If the unmapped attributes are stored as name-value pairs in an auxiliary table, the object update module 570 may perform multiple update operations, one for each name-value pair associated with an unmapped attribute of the object that was modified.

If the object relational mapping module 100 receives a request to delete an object of an object type, the object delete module 590 maps the delete request to delete the appropriate records from the tables corresponding to the object type from the database. If the virtual column is a column of the table corresponding to the object type, the object delete module 590 performs a single delete operation to delete the record of the table corresponding to the object being deleted. If the virtual column is stored as a value in an auxiliary table, the object delete module 590 performs a second delete operation to delete the corresponding row storing the encoded value in the auxiliary table. If the unmapped attributes are stored as name-value pairs in an auxiliary table, the object delete module 590 may perform multiple delete operations, one for deleting each row corresponding to a name-value pair associated with an unmapped attribute of the object being deleted.

Additional Configuration Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for systems disclosed herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for mapping operations in an object model to operations in a relational model, the method comprising:
   storing a representation of an object model comprising one or more object types, each object type associated with a table of a database, wherein objects of each object type map to records stored in the table;
   identifying an object type in the object model, the object type associated with a table comprising a set of columns, the table associated with a virtual column, the object type comprising:
      a set of mapped attributes, wherein a mapped attribute is mapped to a distinct column of the table; and
      a set of unmapped attributes, wherein an unmapped attribute fails to map to a distinct column of the table; and
   storing an object of the object type, the storing comprising:
      storing a record of the table corresponding to the object, wherein each mapped attribute of the object is stored in the record as a value of a column associated with the mapped attribute;
      representing the set of unmapped attributes of the object as an encoded value; and
      storing the encoded value in the virtual column.

2. The method of claim 1, further comprising:
   receiving a request to create a new object of the object type; and
   responsive to the request to create the new object, inserting a new record in the table, wherein the new record is based on values of mapped attributes of the new object;
   determining a new encoded value based on values of the unmapped attributes of the new object; and
   storing the new encoded value in the virtual column associated with the table.

3. The method of claim 1, wherein representing the set of unmapped attributes as the encoded value comprises serializing an auxiliary object comprising the unmapped attributes of the object.

4. The method of claim 1, further comprising:
   receiving a request to read an object of the object type from the database;
   identifying a record of the table corresponding to the requested object;
   assigning values of columns of the record to corresponding mapped attributes of the requested object;
   retrieving an encoded value corresponding to the object from the virtual column;
   decoding the encoded value to obtain a set of decoded values; and
   assigning the decoded values to the unmapped attributes of the requested object.

5. The method of claim 4, wherein decoding the value from the virtual column comprises deserializing the value from the virtual column to generate a set of values corresponding to the unmapped attributes.

6. The method of claim 1, further comprising:
   receiving a request to modify values of one or more attributes of the object;
   identifying a record of the table corresponding to the object; and
   updating each value of the record based on a corresponding mapped attribute of the object;
   responsive to at least one unmapped attribute being modified, determining an encoded value based on the unmapped attributes of the object; and
   updating a value of the virtual column based on the encoded value of the unmapped attribute.

7. The method of claim 1, wherein the virtual column is a column of the table.

8. The method of claim 1, wherein the virtual column is a column of an auxiliary table associated with the table.

9. The method of claim 8, further comprising:
   receiving a request to delete the object;
   deleting a row of the table corresponding to the object; and
   deleting a row of the auxiliary table corresponding to the object.

10. The method of claim 1, wherein the virtual column is configured to store one of: a binary array or a character string.

11. The method of claim 1, further comprising:
   altering the table to add a first column for storing a first unmapped attribute;
   migrating the data from the virtual column to populate the value of the first column, the migrating comprising:

identifying a record of the table;
reading a first encoded value associated with the record from the virtual column;
decoding the first encoded value to determine a value of the first unmapped attribute;
updating the identified record using the value of the first unmapped attribute;
encoding the unmapped attributes other than the first unmapped attribute to determine a second encoded value; and
storing the second encoded value in the virtual column.

12. A method for mapping object data to relational data, the method comprising:
receiving a specification describing an object model, the object model comprising one or more object types, wherein objects of each object type are stored in a table of a database;
receiving, from the database, information describing a table associated with an object type, the table comprising a set of columns, the object type comprising a set of mapped attributes, each mapped attribute associated with a distinct column of the set of columns, the object type further comprising a plurality of unmapped attributes;
identifying a set of mapped attributes of the object type, each mapped attribute mapped to a distinct column of the set of columns;
identifying an auxiliary table configured to store name-value pairs;
identifying a set of unmapped attributes of the object type for storing in the auxiliary table, wherein each unmapped attribute fails to map to a distinct column from the set of columns;
storing an object of the object type in the database, the storing comprising:
identifying a record of the table associated with the object;
storing each mapped attribute in the corresponding column of the table; and
storing the unmapped attributes as name-value pairs in the auxiliary table.

13. The method of claim 12, wherein the auxiliary table stores each unmapped attribute of the object as a separate row associated with the object.

14. The method of claim 12, further comprising:
receiving a request to read an object of the object type from the database;
identifying a record of the table corresponding to the requested object; and
assigning values of columns of the record to corresponding mapped attributes of the requested object;
retrieving name-value pairs associated with the object from the auxiliary table; and
determining values of unmapped attributes of the object based on name-value pairs corresponding to the unmapped attributes.

15. The method of claim 12, further comprising:
receiving a request to modify values of one or more attributes of the object;
responsive to a mapped attribute value being modified, updating the corresponding column of a record of the table based on the modified value of the corresponding mapped attribute; and
responsive to an unmapped attribute value being modified, updating a value in the auxiliary table associated with the object having a name of the unmapped attribute.

16. The method of claim 12, further comprising:
receiving a request to delete the object;
deleting a row of the table corresponding to the object; and
deleting each row storing a name-value pair corresponding to the object from the auxiliary table.

17. A computer-implemented system for object-relational mapping using virtual columns, the system comprising:
a computer processor; and
a non-transitory computer-readable storage medium storing instructions configured to execute on the computer processor, the instructions for:
storing a representation of an object model comprising one or more object types, each object type associated with a table of a database, wherein objects of each object type map to records stored in the table;
identifying an object type in the object model, the object type associated with a table comprising a set of columns, the table associated with a virtual column, the object type comprising:
a set of mapped attributes, wherein a mapped attribute is mapped to a distinct column of the table; and
a set of unmapped attributes, wherein an unmapped attribute fails to map to a distinct column of the table;
receiving a request to create a new object of the object type; and
storing an object of the object type, the storing comprising:
storing a record of the table corresponding to the object, wherein each mapped attribute of the object is stored in the record as a value of a column associated with the mapped attribute;
representing the set of unmapped attributes of the object as an encoded value; and
storing the encoded value in the virtual column.

18. The system of claim 17, wherein the non-transitory computer-readable storage medium further comprises instructions for:
receiving a request to create a new object of the object type; and
responsive to the request to create the new object, inserting a new record in the table, wherein the new record is based on values of mapped attributes of the new object; and
storing a new encoded value in the virtual column associated with the table, the new encoded value based on values of the unmapped attributes of the new object.

19. The system of claim 17, wherein the non-transitory computer-readable storage medium further comprises instructions for:
receiving a request to read an object of the object type from the database;
identifying a record of the table corresponding to the requested object;
assigning values of columns of the record to corresponding mapped attributes of the requested object;
retrieving an encoded value corresponding to the object from the virtual column;
decoding the encoded value to obtain a set of decoded values; and
assigning the decoded values to the unmapped attributes of the requested object.

20. The system of claim 17, wherein the non-transitory computer-readable storage medium further comprises instructions for:
receiving a request to modify values of one or more attributes of the object;

identifying a record of the table corresponding to the object; and updating each value of the record based on a corresponding mapped attribute of the object;

responsive to at least one unmapped attribute being modified, determining an encoded value based on the unmapped attributes of the object; and updating a value of the virtual column based on the encoded value of the unmapped attribute.

* * * * *